June 14, 1960   J. S. FARROW ET AL   2,940,775
TRAILER HITCH FOR CAR, TRUCK OR TRACTOR
Filed May 6, 1959
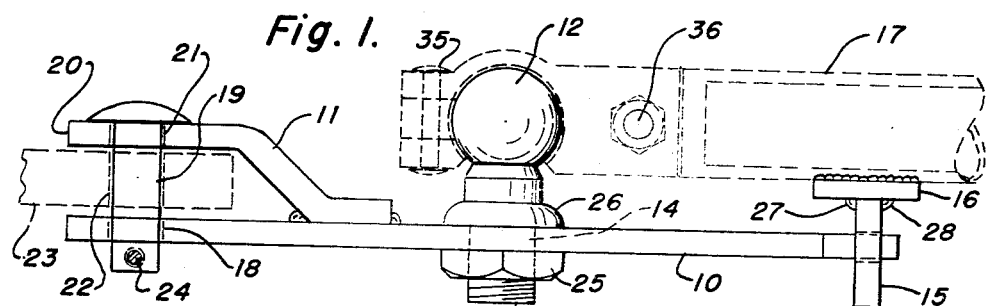
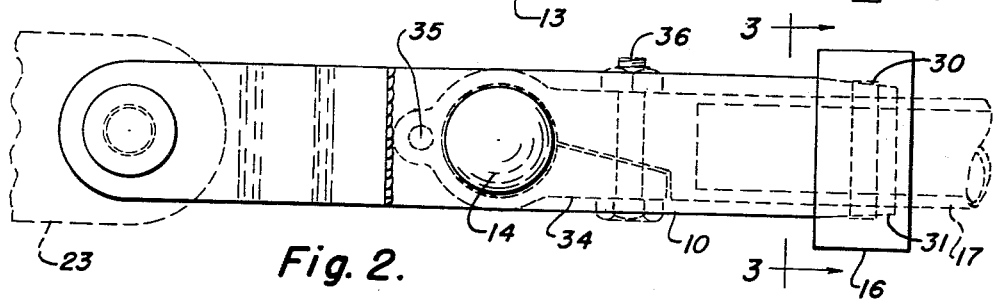
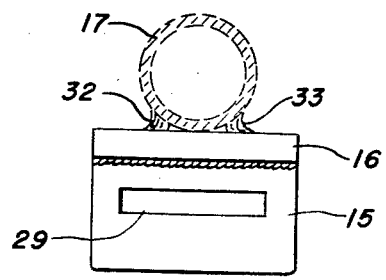
INVENTORS
JOHN S. FARROW AND
CORNELIUS B. MANLEY, SR.
BY *Victor J. Evans & Co.*
ATTORNEYS

United States Patent Office 2,940,775
Patented June 14, 1960

2,940,775

TRAILER HITCH FOR CAR, TRUCK, OR TRACTOR

John S. Farrow, Box 53, Webster, Tex., and Cornelius B. Manley, Sr., Box 35, League City, Tex.

Filed May 6, 1959, Ser. No. 811,402

3 Claims. (Cl. 280—415)

This invention relates to hitches for attaching trailers to motor vehicles, and in particular a hitch that enables an operator of a trailer to make a quick change from a ball hitch to a hitch that can be used on a farm tractor drawbar.

The purpose of this invention is to provide a hitch by which a trailer may be connected to a drawbar of a farm tractor.

Conventional trailer hitches used for connecting trailers to tractors having cabs, and other motor vehicles, are provided with a ball or a socket for a ball and a hitch of this type is not suitable for connecting a trailer to a farm tractor as farm tractors, and the like are provided with drawbars, and no provision is made for a ball and socket connection.

With this thought in mind this invention contemplates an elongated bar having drawbar connecting means on one end, with a ball extending upwardly from the bar and positioned to nest in a socket of a trailer tongue and with the end opposite to that on which the drawbar connection is provided positioned to extend into an opening in a bracket secured, such as by welding, to the under surface of the trailer tongue.

The object of this invention is, therefore, to provide a trailer hitch by which a tongue of a trailer is connected by a conventional ball and socket joint to a drawbar of a farm tractor.

Another object of the invention is to provide a hitch for connecting a trailer to a farm tractor without changing the conventional drawbar of the tractor.

Another important object of the invention is to provide a hitch for connecting a trailer to a farm tractor in which a tongue of the trailer may also be used on a conventional ball-hitch of a tractor.

A further object of the invention is to provide a hitch for connecting a trailer to the drawbar of a farm tractor in which the hitch is of a simple and economical construction.

With these and other objects and advantages in view the invention embodies an elongated bar having an offset arm on one end providing an area for receiving a drawbar of a tractor, with a ball positioned on the intermediate part and with the end opposite to that on which the offset arm is positioned extended into a bracket secured such as by welding, to the under surface of a trailer tongue.

Other features and advantages of the invention will appear from the following description taken in connection with the drawing, wherein:

Figure 1 is a side-elevational view showing the improved hitch with a ball for connecting a trailer tongue to the hitch, with an offset arm for connecting the hitch to the drawbar of a farm tractor, and with the tongue of a trailer shown in dotted lines thereon.

Figure 2 is a plan view of the trailer hitch shown in Figure 1.

Figure 3 is a cross-section through the hitch taken on line 3—3 of Figure 2, showing a bracket having on opening therein for receiving the tapered edges of the elongated bar of the hitch.

Referring now to the drawing wherein like reference characters denote corresponding parts the improved trailer hitch of this invention includes an elongated bar 10 having an offset arm 11 secured, such as by welding, on one end, with a ball 12 with a threaded shank 13 extended through an opening 14 in the bar 10 and a bracket 15 having a flange 16 on the upper end by which the bracket is secured, such as by welding, to a trailer tongue 17.

The bar 10 is provided with an opening 18 through which the lower end of a pin, such as a pin 19, is positioned and the extended portion 20 of the arm 11 is provided with a similar opening 21 that is aligned with the opening 18, whereby the pin 19 extends through the openings 18 and 21 and also through an opening 23 in a drawbar indicated by the numeral 23. The lower end of pin 19 is provided with an opening 24 for a cotter pin or the like.

The ball 12 is clamped to the bar 10 by a nut 25 which is threaded on the shank 13 and with the shank 13 extended through the opening 14 in the bar 10 a shoulder 26, from which the shank 13 extends, is clamped against the upper surface of the bar.

The flange 16 at the upper end of the bracket 15 is secured to the bracket, such as by welding, shown at the points 27 and 28, and the bracket is provided with an elongated opening 29 that is positioned to receive the end of bar 10, as shown in Figure 1. The end of bar 10 that extends through the opening 29 is provided with tapered edges 30 and 31, and the flange 16 is secured to the lower surface of the tongue 17, and such as by welding, as shown at the points 32 and 33.

In the design shown the trailer tongue 17 is provided with a section 34 that is hinged by pin 35, and the section 34 is retained in locking position over the ball 12 by a bolt 36.

With the parts assembled as illustrated and described the forward end of the bar 10 is connected to the drawbar 23 of a farm tractor or the like and the forward end of the trailer tongue, which is aligned with the bar 10 is secured in position over the ball 12 with the tapering surfaces 30 and 31 at the end of the bar 10 fitted snugly in the opening 29 of the bracket 15 so that the hitch may readily be removed and the trailer tongue used in the conventional manner.

It will be understood that modifications, within the scope of the appended claims, may be made in the design and arrangement of the parts without departing from the spirit of the invention.

What is claimed is:

1. A trailer hitch for farm tractors comprising an elongated bar having an offset arm on one end with aligned openings extended through the arm and bar for receiving a pin for connecting the bar to a drawbar, said bar having an opening in the intermediate part, and having tapered edges on the end opposite to the end on which the offset arm is positioned, a ball having a shank positioned in the opening in the intermediate part of the bar and clamped in position by a nut threaded on said shank, and an outer bracket having a flange on the upper edge for securing the bracket to a trailer tongue and having an opening therethrough for receiving the end of the bar with the tapering edges thereon.

2. In a farm tractor trailer hitch, the combination which comprises an elongated bar having a ball extended upwardly from the intermediate portion, an offset arm with aligned openings extending through the offset arm and bar for receiving a pin for connecting the bar to a drawbar of a tractor, and having tapered surfaces at the sides of the end opposite to that on which the offset arm is positioned, and a bracket attached to a trailer tongue and having an opening therein for receiving the end of the bar opposite to the end on which the offset arm is positioned.

3. In a trailer hitch for farm tractors having drawbars, the combination which comprises an elongated bar having an opening in the intermediate portion, tapering edges on the sides on one end and an offset arm on the opposite end, the offset arm having an opening extending therethrough said opening being aligned with an opening in the bar upon which the offset arm is mounted, the opening in the offset arm being positioned to receive a king pin for connecting the bar to a drawbar of a farm tractor, a ball having a threaded shank extended from a shoulder thereon positioned with the shank extended through the opening in the intermediate portion of the bar and having a nut on the shank for clamping the ball in position on said bar, and a bracket having an opening for receiving the end of the bar having the tapering edges and having a flange for connecting the bracket to a trailer tongue, on the upper edge.

References Cited in the file of this patent
UNITED STATES PATENTS

| | | |
|---|---|---|
| 2,523,210 | Hedgpeth | Sept. 19, 1950 |
| 2,603,503 | Moen | July 15, 1952 |
| 2,654,613 | Blair et al. | Oct. 6, 1953 |
| 2,844,389 | Burnett | July 22, 1958 |

FOREIGN PATENTS

| | | |
|---|---|---|
| 400,834 | Great Britain | Nov. 2, 1933 |